(12) United States Patent
Xu et al.

(10) Patent No.: US 9,723,497 B2
(45) Date of Patent: Aug. 1, 2017

(54) NETWORK ASSISTED INTERFERENCE CANCELLATION/SUPPRESSION FOR MULTIPLE SERVICES

(71) Applicant: QUALCOMM Incorporated, San Diego, CA (US)

(72) Inventors: Hao Xu, San Diego, CA (US); Tao Luo, San Diego, CA (US); Wanshi Chen, San Diego, CA (US); Peter Gaal, San Diego, CA (US); Taesang Yoo, San Diego, CA (US); Yongbin Wei, San Diego, CA (US); Durga Prasad Malladi, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 156 days.

(21) Appl. No.: 14/244,739

(22) Filed: Apr. 3, 2014

(65) Prior Publication Data

US 2014/0301268 A1    Oct. 9, 2014

Related U.S. Application Data

(60) Provisional application No. 61/808,316, filed on Apr. 4, 2013.

(51) Int. Cl.
*H04L 5/00* (2006.01)
*H04W 24/02* (2009.01)
(Continued)

(52) U.S. Cl.
CPC ........... *H04W 24/02* (2013.01); *H04J 11/005* (2013.01); *H04L 5/0053* (2013.01); *H04W 72/082* (2013.01); *H04B 1/7103* (2013.01)

(58) Field of Classification Search
None
See application file for complete search history.

(56) References Cited

U.S. PATENT DOCUMENTS

2010/0272004 A1* 10/2010 Maeda ................. H04L 5/0007
370/312
2011/0194477 A1*  8/2011 Damnjanovic ..... H04W 72/005
370/312

(Continued)

FOREIGN PATENT DOCUMENTS

GB    2487756 A    8/2012

OTHER PUBLICATIONS

International Search Report and Written Opinion—PCT/US2014/033000—ISA/EPO—Sep. 23, 2014.

*Primary Examiner* — Chi H Pham
*Assistant Examiner* — Soon-Dong D Hyun
(74) *Attorney, Agent, or Firm* — Linda G. Gunderson

(57) ABSTRACT

Certain aspects of the present disclosure relate to methods and apparatus for network assisted interference cancellation (IC) and interference suppression (IS) for multiple services. According to aspects a user equipment (UE) may determine information regarding system parameters for one or more types of communications services used to transmit potentially interfering signals in one or more neighbor cells, wherein a type of the information determined depends on the type of communications service. The UE may perform interference management using the determined information to cancel or suppress interference caused by the potentially interfering signals.

30 Claims, 14 Drawing Sheets

(51) Int. Cl.
*H04J 11/00* (2006.01)
*H04W 72/08* (2009.01)
*H04B 1/7103* (2011.01)

(56) References Cited

U.S. PATENT DOCUMENTS

| | | | |
|---|---|---|---|
| 2012/0122440 A1 | 5/2012 | Krishnamurthy et al. | |
| 2012/0275394 A1* | 11/2012 | Gunnarsson | H04W 28/048 370/329 |
| 2012/0282864 A1 | 11/2012 | Dimou et al. | |
| 2013/0208646 A1* | 8/2013 | Long | H04W 48/02 370/312 |
| 2014/0126408 A1* | 5/2014 | Ding | H04W 24/08 370/252 |
| 2014/0206341 A1* | 7/2014 | Siomina | H04W 36/0088 455/422.1 |
| 2014/0349582 A1* | 11/2014 | Xiao | H04W 64/00 455/67.11 |
| 2015/0085717 A1* | 3/2015 | Papasakellariou | H04L 5/14 370/329 |
| 2015/0117294 A1* | 4/2015 | Li | H04W 72/0446 370/312 |
| 2015/0153395 A1* | 6/2015 | Siomina | H04B 17/309 324/76.39 |
| 2015/0230249 A1* | 8/2015 | Nguyen | H04W 4/005 370/329 |
| 2015/0282157 A1* | 10/2015 | Kim | H04W 48/14 370/329 |
| 2016/0192339 A1* | 6/2016 | Axmon | H04W 24/10 370/329 |

\* cited by examiner

NETWORK ASSISTED INTERFERENCE CANCELLATION/SUPPRESSION FOR MULTIPLE SERVICES

CROSS-REFERENCE TO RELATED APPLICATIONS

This application claims benefit of priority to U.S. Provisional Application Ser. No. 61/808,316, filed Apr. 4, 2013, which is expressly incorporated herein by reference in its entirety.

BACKGROUND

Field

The present disclosure relates generally to wireless communication, and more particularly, to methods and apparatus performing interference management to cancel or suppress interference caused by potentially interfering signals transmitted by one or more types of communications services.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communication by a user equipment (UE). The method generally includes determining information regarding system parameters for one or more types of communications services used to transmit potentially interfering signals in one or more neighbor cells, wherein a type of the information determined depends on the type of communications service, and performing interference management using the determined information to cancel or suppress interference caused by the potentially interfering signals.

Certain aspects of the present disclosure provide a method for wireless communication by an eNB. The method generally includes determining information regarding system parameters for one or more types of communications services used to transmit potentially interfering signals in one or more neighbor cells, wherein a type of the information determined depends on the type of communications service, and transmitting signaling to one or more user equipments (UEs) to assist in performing interference management using the determined information to cancel or suppress interference caused by the potentially interfering signals.

Certain aspects of the present disclosure provide an apparatus for wireless communication. The apparatus generally includes means for determining information regarding system parameters for one or more types of communications services used to transmit potentially interfering signals in one or more neighbor cells, wherein a type of the information determined depends on the type of communications service, and means for performing interference management using the determined information to cancel or suppress interference caused by the potentially interfering signals.

Certain aspects of the present disclosure provide an apparatus for wireless communication. The apparatus generally includes means for determining information regarding system parameters for one or more types of communications services used to transmit potentially interfering signals in one or more neighbor cells, wherein a type of the information determined depends on the type of communications service, and means for transmitting signaling to one or more user equipments (UEs) to assist in performing interference management using the determined information to cancel or suppress interference caused by the potentially interfering signals.

Certain aspects of the present disclosure provide an apparatus for wireless communication. The apparatus includes at least one processor and a memory coupled to the at least one processor. The at least one processor is generally configured to determine information regarding system parameters for one or more types of communications services used to transmit potentially interfering signals in one or more neighbor cells, wherein a type of the information determined depends on the type of communications service, and perform interference management using the determined information to cancel or suppress interference caused by the potentially interfering signals.

Certain aspects of the present disclosure provide an apparatus for wireless communication. The apparatus includes at least one processor and a memory coupled to the at least one processor. The at least one processor is generally configured to determine information regarding system parameters for one or more types of communications services used to transmit potentially interfering signals in one or more neighbor cells, wherein a type of the information determined depends on the type of communications service, and transmit signaling to one or more user equipments (UEs) to assist in performing interference management using the determined information to cancel or suppress interference caused by the potentially interfering signals.

Certain aspects of the present disclosure provide a computer-program product for wireless communication. The computer-program product may include a non-transitory computer-readable medium having code stored thereon. The code generally includes instructions for determining information regarding system parameters for one or more types of communications services used to transmit potentially interfering signals in one or more neighbor cells, wherein a type of the information determined depends on the type of communications service, and performing interference management using the determined information to cancel or suppress interference caused by the potentially interfering signals.

Certain aspects of the present disclosure provide a computer-program product for wireless communication. The computer-program product may include a non-transitory computer-readable medium having code stored thereon. The code generally includes instructions for determining information regarding system parameters for one or more types of communications services used to transmit potentially interfering signals in one or more neighbor cells, wherein a type of the information determined depends on the type of communications service, and transmitting signaling to one or more user equipments (UEs) to assist in performing interference management using the determined information to cancel or suppress interference caused by the potentially interfering signals.

DETAILED DESCRIPTION

Figure 1:
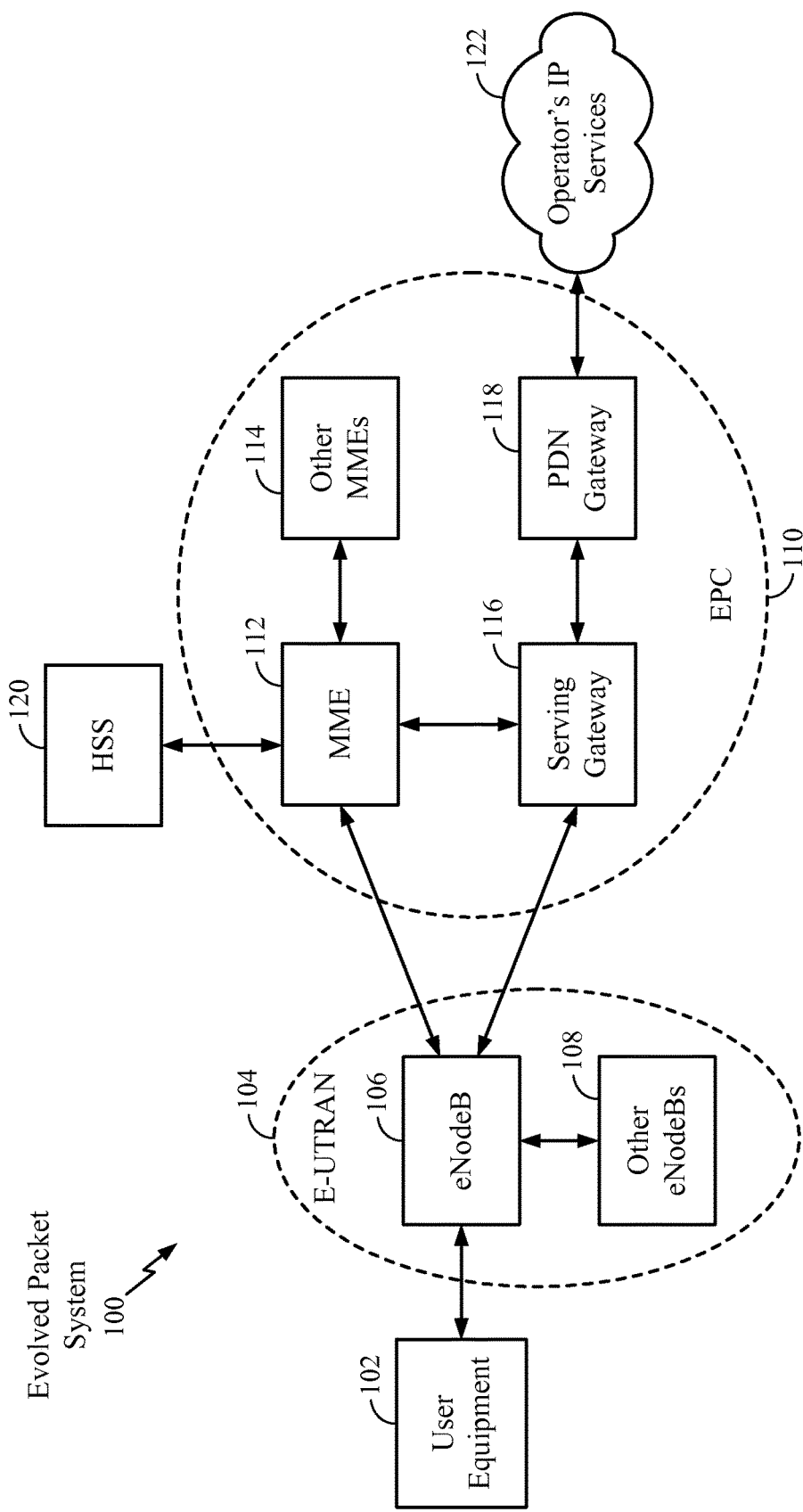
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station (BS), a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE 102 may be coupled to the PDN through the LTE network.

Figure 2:
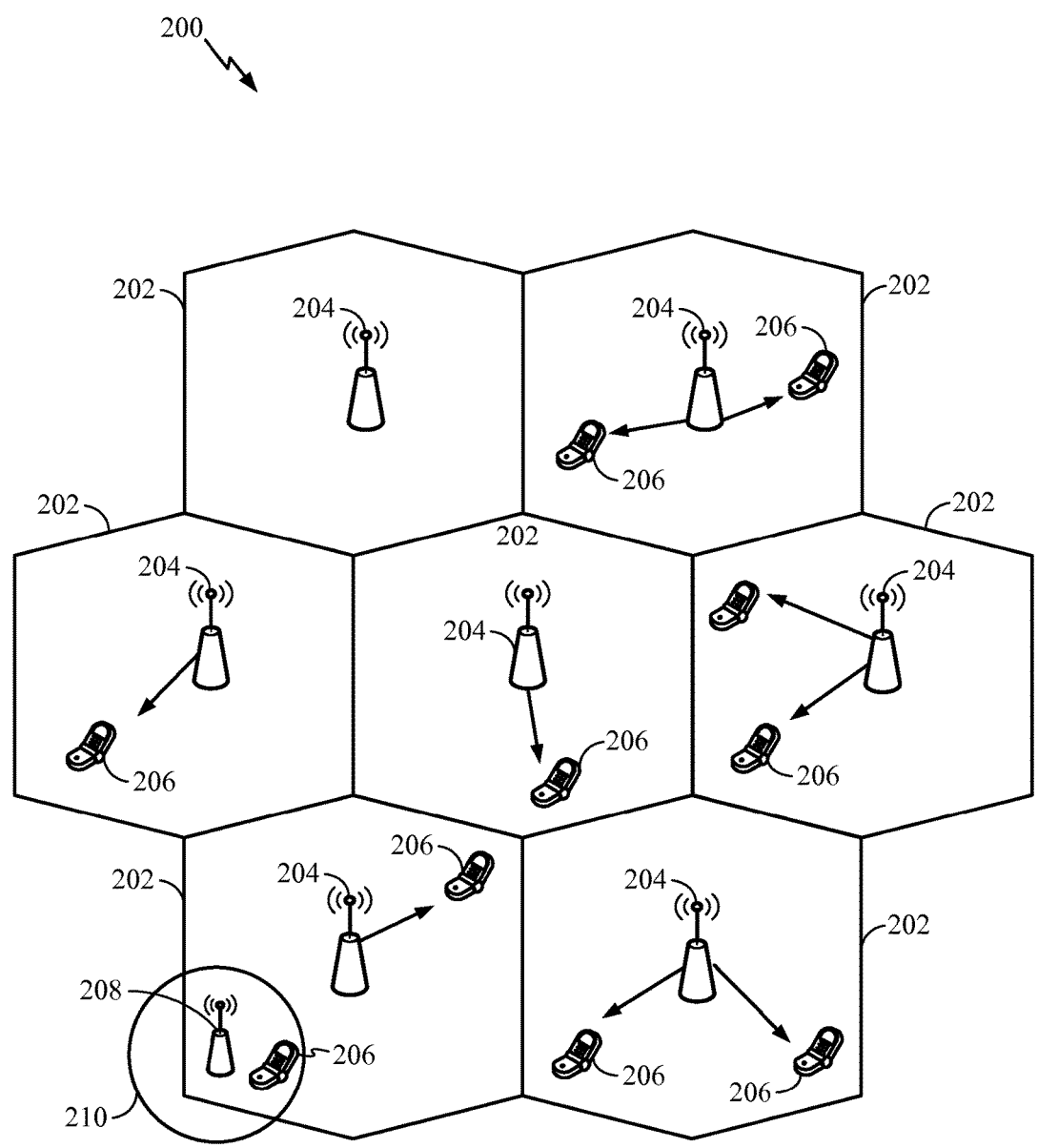
FIG. 2 is a diagram illustrating an example of an access network.

FIG. 2 is a diagram illustrating an example of an access network 200 in a LTE network architecture. "LTE" refers generally to LTE and LTE-Advanced (LTE-A).

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, an UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDM. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
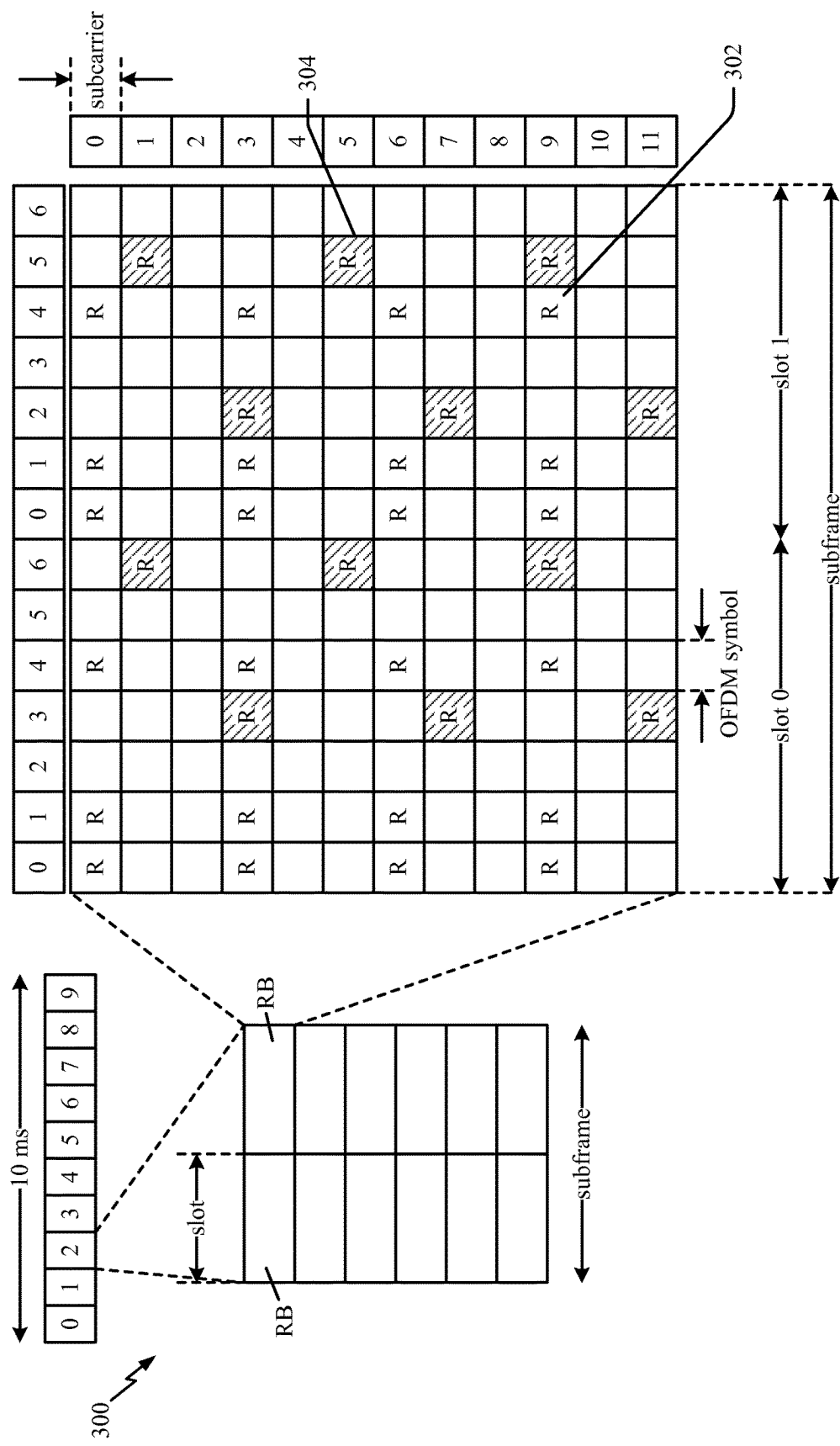
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
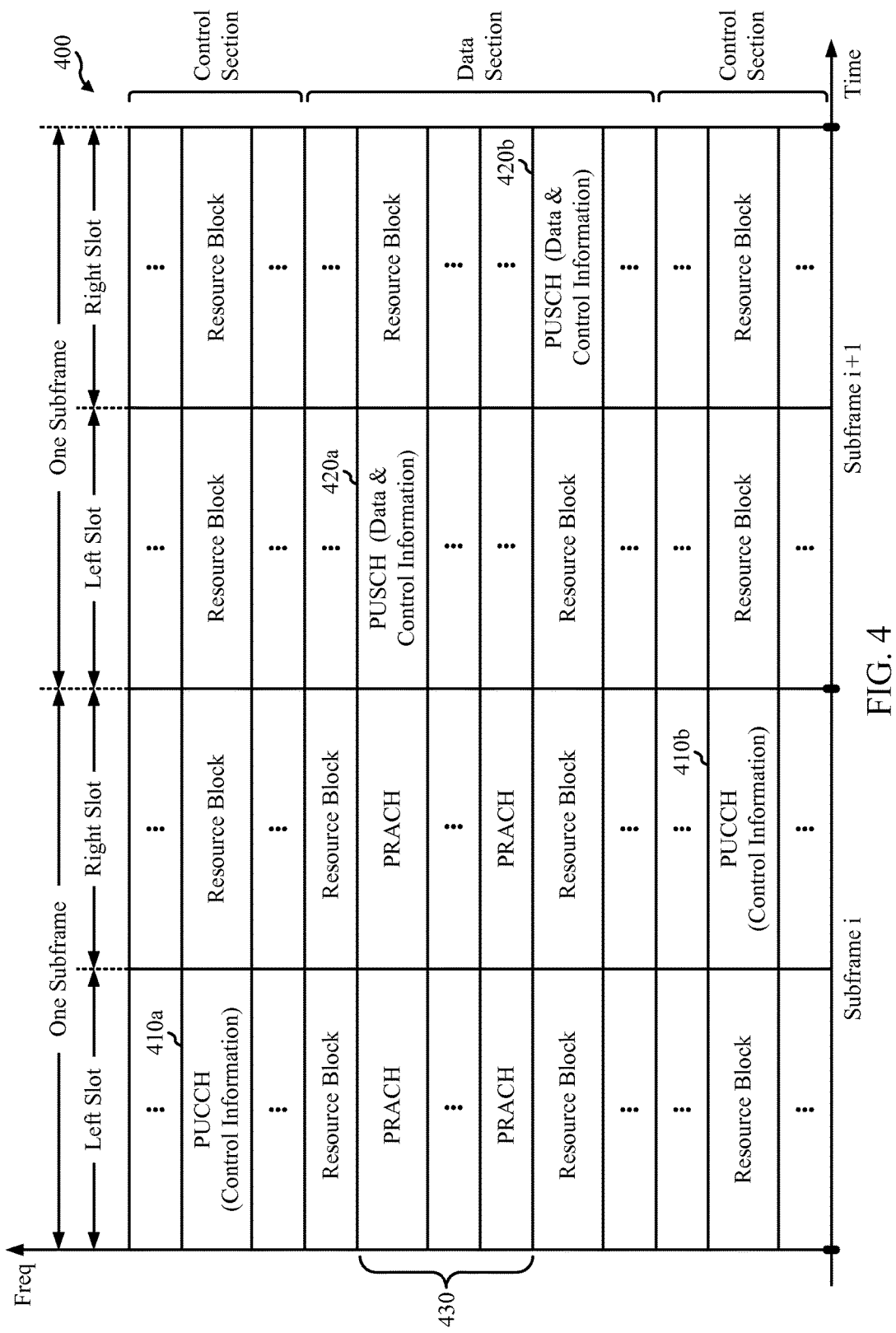
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
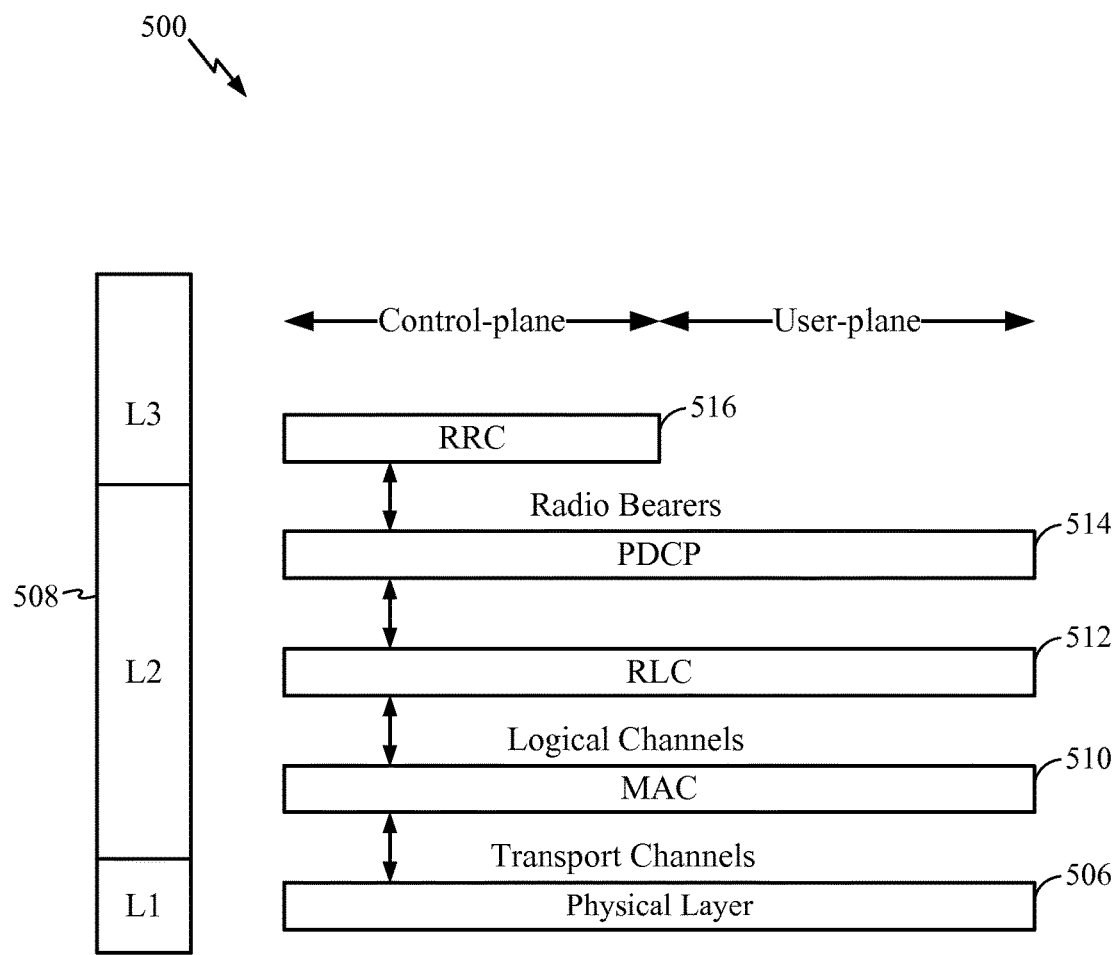
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC)

sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
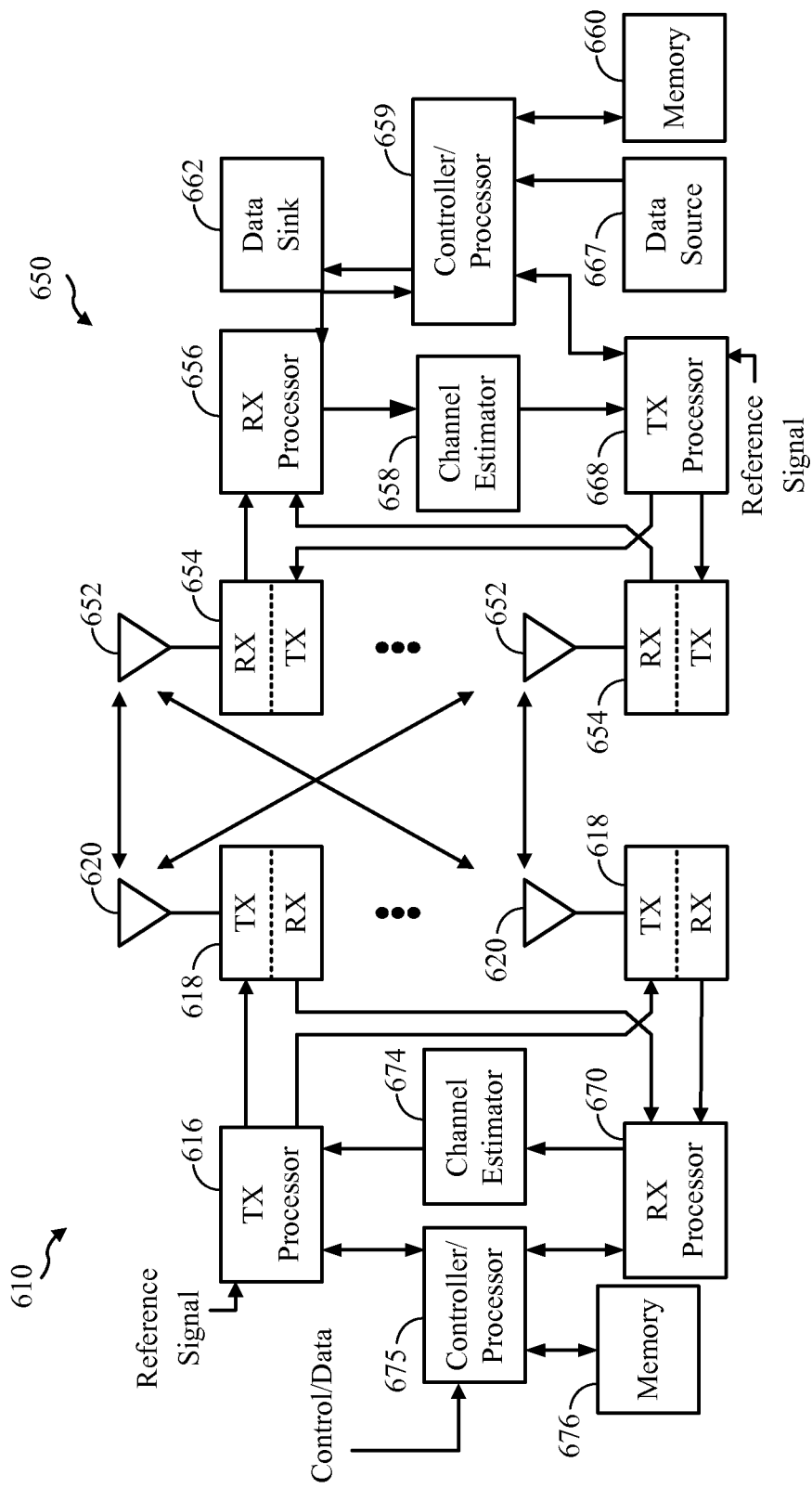
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

According to aspects of the disclosure, one or more modules of eNB 610 and one or more modules of UE 650 may perform the operations described herein. For example, controller/processor 675 of eNB 610 and controller/processor 659 of UE 650 may perform operations described herein. According to aspects, controller/processor 675, Tx/Rx 618, and/or antenna 620 may perform operations described herein, for example, with reference to FIG. 12, and controller/processor 659, Tx/Rx 654, and antenna 652 may perform operations described herein, for example, with reference to FIG. 11.

Figure 7:
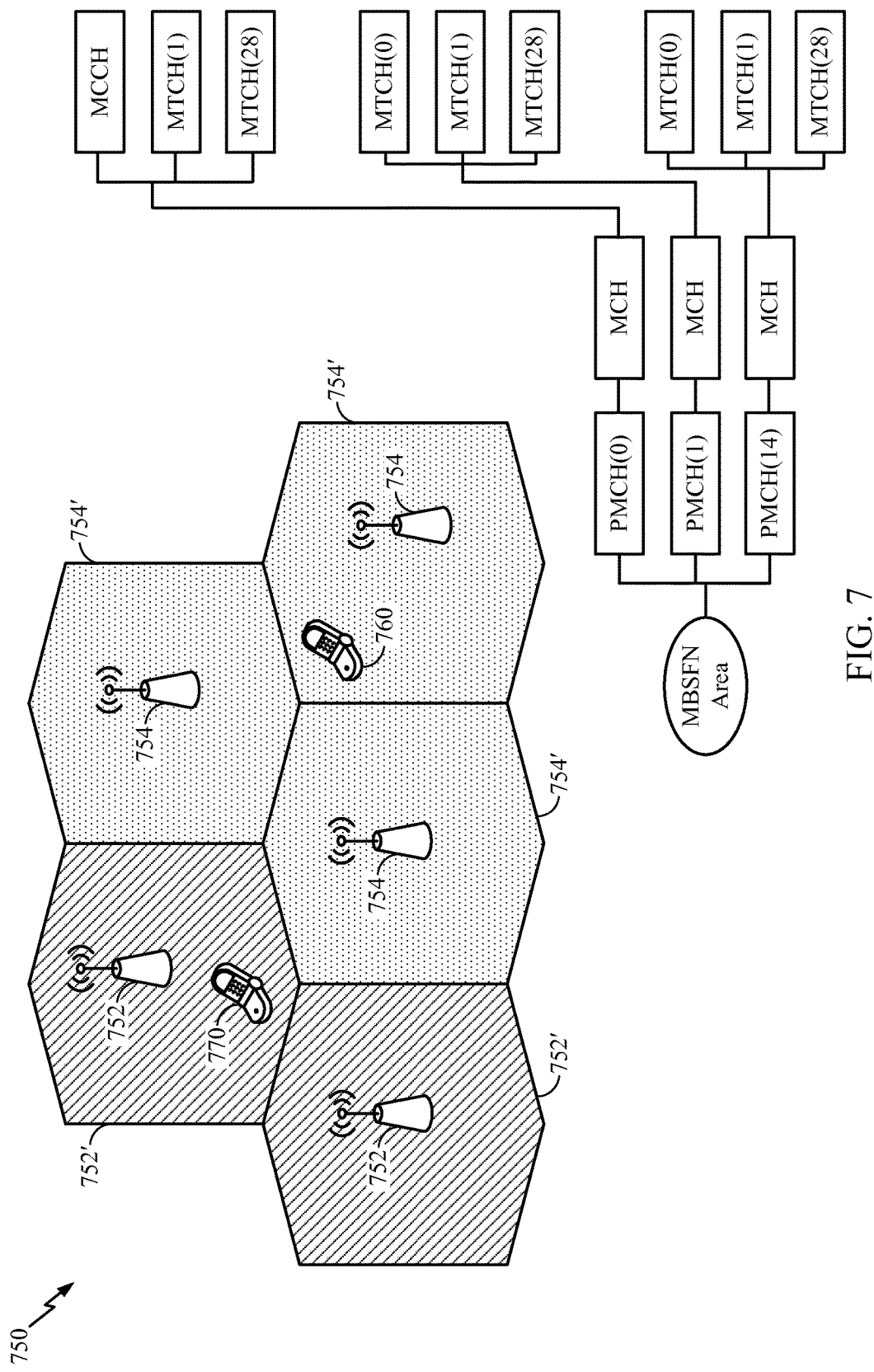
FIG. 7 is a diagram illustrating evolved Multimedia Broadcast Multicast Service (eMBMS) in a Multimedia Broadcast Single Frequency Network.

FIG. 7 is a diagram 750 illustrating evolved Multicast Broadcast Multimedia Service (eMBMS) in a Multimedia Broadcast Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Advanced Interference Management

As described herein, interference management may include interference suppression (IS) and/or interference cancellation (IC). IS may be performed by minimum mean square error (MMSE) interference rejection. Multi-user detection (MUD) for interference management may involve joint maximum likelihood (ML) detection for desired signals and for interferences.

For symbol-level interference cancellation (SLIC), a code scheme used to encode a PDSCH transmission may be ignored and each tone may be treated independently. For each tone (e.g., symbol), the most-likely transmitted bits may be estimated, for example, based on an employed spatial scheme and modulation format. An estimate of one or more interfering signals may be reconstructed accordingly.

For codeword-level interference cancellation (CWIC), a UE may take into account the coding scheme used by an interferer to transmit each PDSCH payload that the UE desires to cancel. This may be performed, for example, to exploit error-correction capabilities of turbo-coding for PDSCH. Generally, and assuming that reliable turbo-decoding may be ensured (e.g., under a high signal-to-interference-plus-noise ratio (SINR)), the reconstructed interfering signals may be more reliable with CWIC as compared to SLIC.

Figure 8:
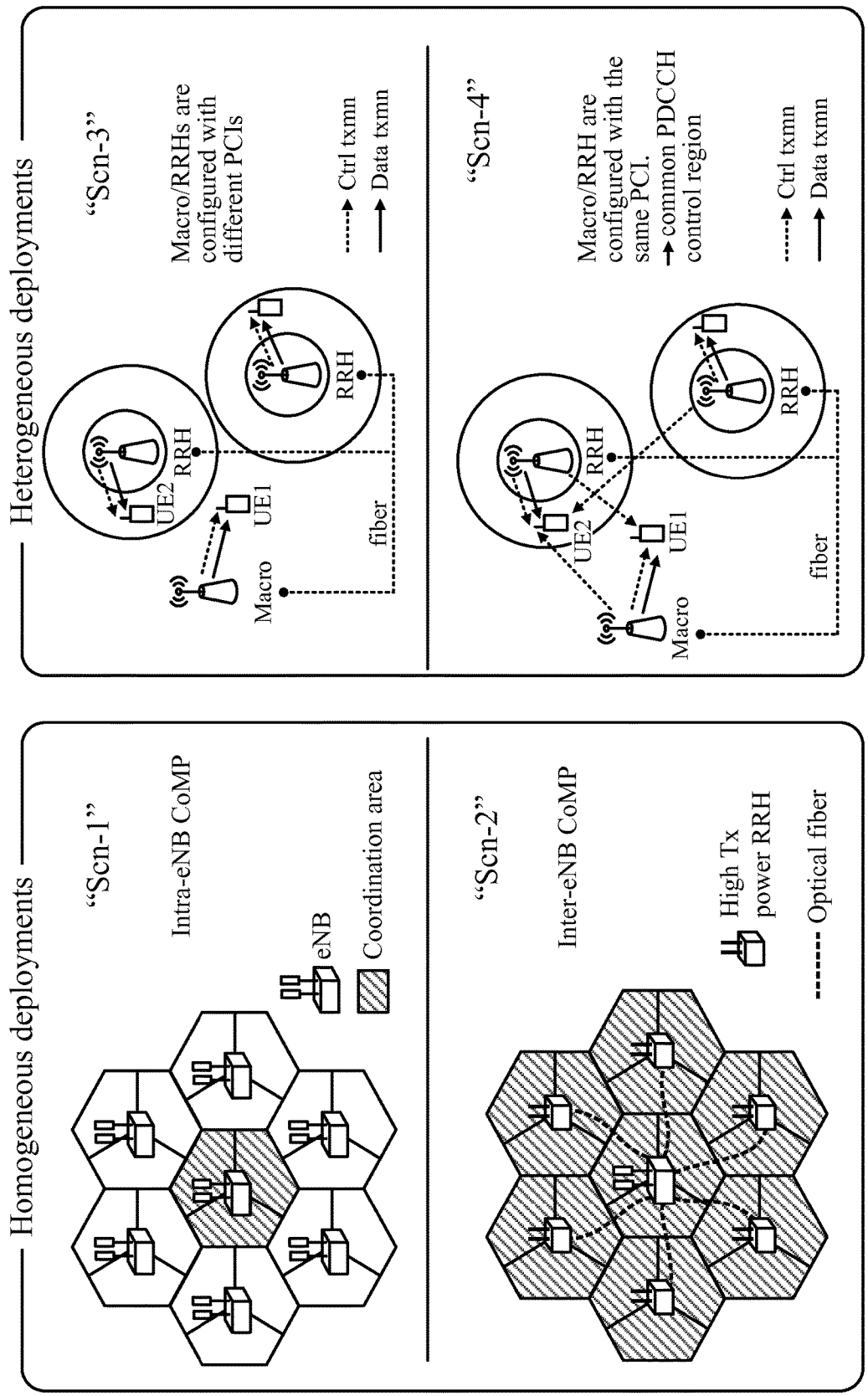
FIG. 8 illustrates example LTE deployment scenarios.

FIG. 8 illustrates example deployment scenarios for LTE Release 11. Scenarios 1 and 2 (Scn-1 and Scn-2, respectively), illustrate example homogeneous deployments. Scenario 1 illustrates an example intra-eNB Coordinated Multi-Point (CoMP) communication setup. Scenario 2 illustrates an example inter-eNB CoMP setup involving a high transmission power remote radio head (RRH).

Scenarios 3 and 4 (Scn-3 and Scn-4, respectively) of FIG. 8 illustrate example heterogeneous deployments. In Scenario 3, a macro base station and RRHs may be configured with different physical cell identifiers (PCIs). In Scenario 4, a macro base station and RRHs may be configured with the same PCI. This may result in a common PDCCH control region.

Figure 9A:
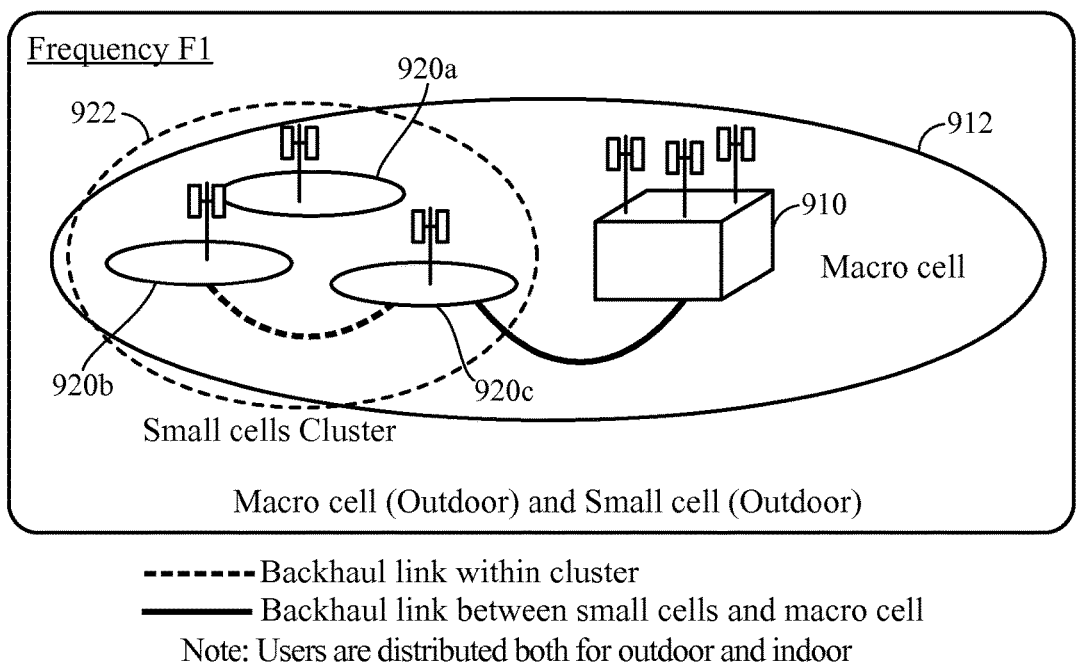
FIGS. 9A-9C illustrate example deployment scenarios for small cells in LTE Release 12, in which aspects of the present disclosure may be practiced.
Figure 9B:
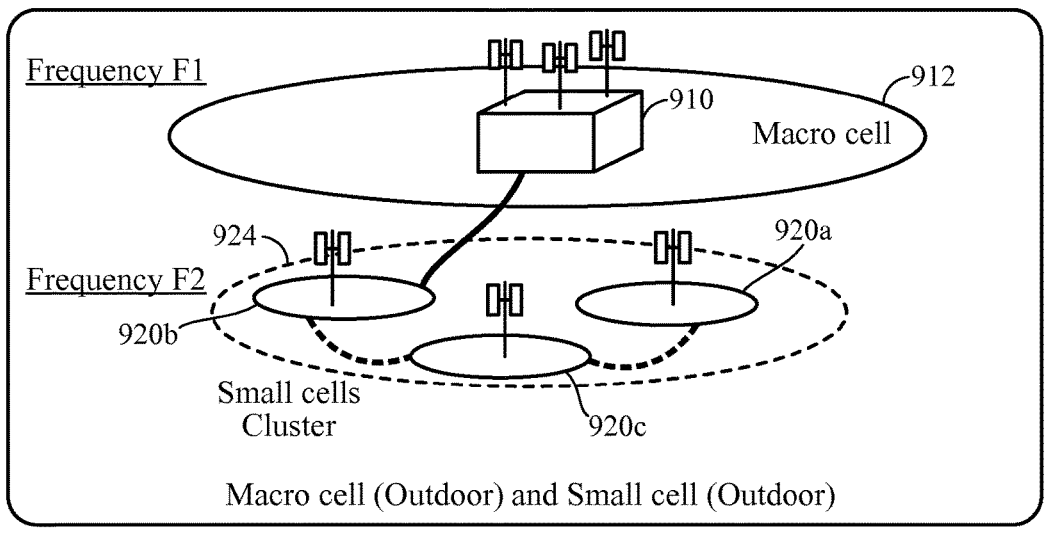
Figure 9B:
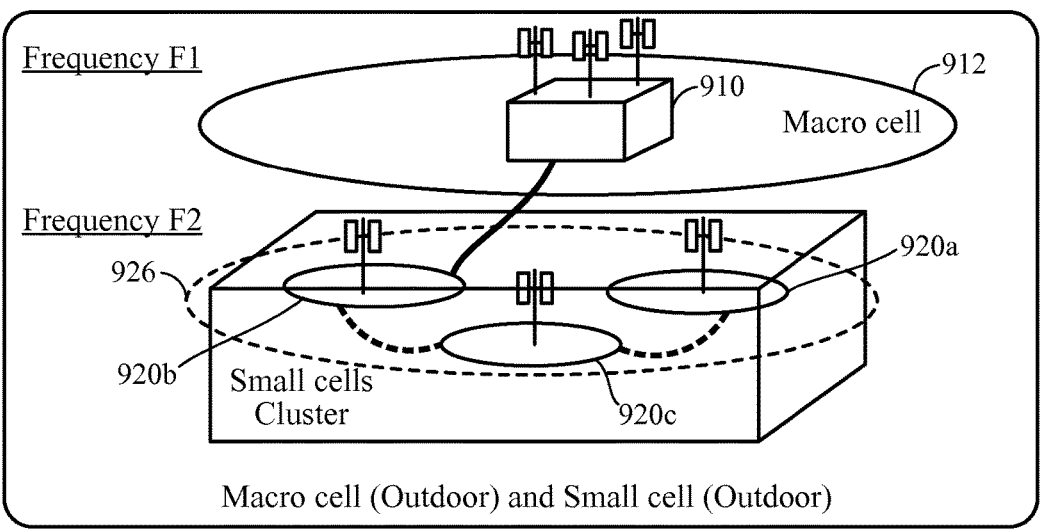
Figure 9C:
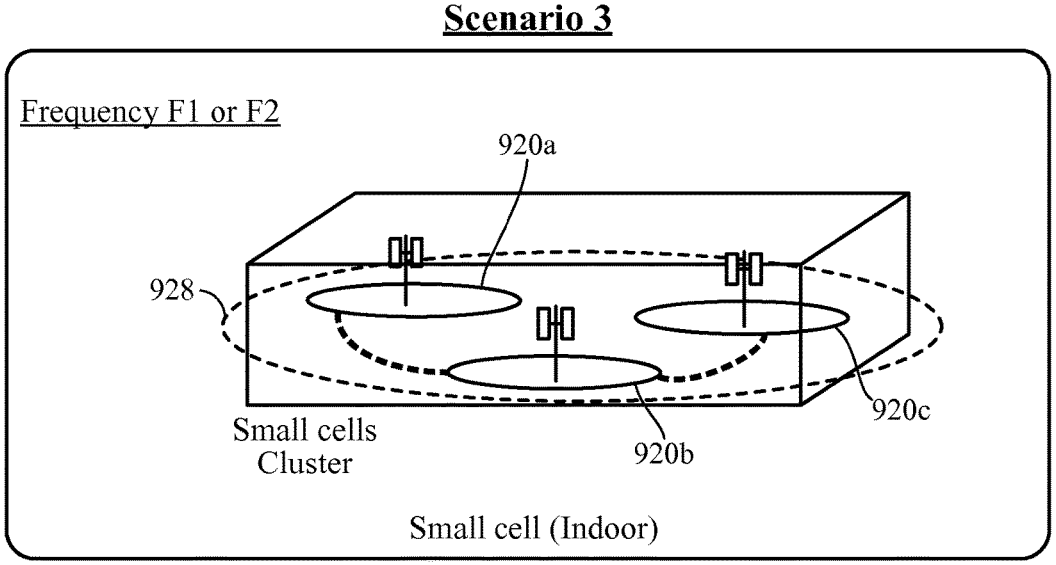

FIGS. 9A, 9B, and 9C illustrate example deployment scenarios for small cells (e.g., pico and femto cells in a HetNet) in LTE Release 12. In some cases, to enhance coverage and service, it may be desirable to have a deployment of small cells 920a, 920b, 920c in addition to a macro cell 910. These deployments may include, for example, small cells which operate on the same frequency band (F1) as a macro cell as in FIG. 9A, or on a different frequency band (F2) as in FIG. 9B.

Small cell deployments may also include small cell clusters which cover an area 922 within a macro cell's area 912, as in FIG. 9A, or an area 924, 926, 928 that is outside of a macro cell's area, as in FIGS. 9B and 9C. As an example, a network operator may choose to deploy a small cell cluster within a macro cell's area 912 in order to improve service in the small cell cluster's area 922. The small cell cluster's area may be at the edge of the macro cell's area, for example. A network operator may choose to deploy a small cell cluster outside of a macro cell's area to extend service to an area 924, 926 with too few users to justify deploying a macro cell, for example.

Small cell deployments may also include a cluster of small cells that is not directly linked to a macro cell, as in FIG. 9C. For example, a network operator may choose to deploy a small cell cluster that is not directly linked to a macro cell to provide service to an area where a large number of users may gather, such as a stadium.

Traditional LTE design focuses on, for example, improvement of spectral efficiency, ubiquitous coverage, and enhanced quality of service (QoS). This typically results in high-end devices, including state-of-the-art smartphones and tablets. However, low-cost, low-rate devices should be supported as well. For example, some market projections show that the number of low-cost devices may largely exceed the number of cell phones presently used.

Thus, a study regarding low-cost Machine Type Communications (MTC) UEs based on LTE was performed in LTE Release 11. Particularly, reduction of maximum bandwidth, single receive radio frequency (RF) chain, reduction of peak rate, reduction of transmit power, and half-duplex operation were under study.

Since the intended data rate for low-cost devices may be less than 100 kbps, it may be possible to operate low-cost devices at a narrow bandwidth only, in an effort to reduce costs. Accordingly, two operational scenarios may occur.

According to a first, more straightforward deployment, a narrow bandwidth, e.g., 1.25 MHz, may be set aside to support MTC operations. Minimal to no standard changes may be necessary for such operations.

According to another scenario, low-cost UEs may operate in a large bandwidth. These low-cost UEs may co-exist with regular UEs. According to this scenario, low-cost UEs may operate in the same large bandwidth as non-low cost UEs, for example up to 20 MHz. This may involve little to no impact on the standard, but may not reduce cost and battery power consumption for low-cost UEs. Alternatively, for the scenario, low-cost UEs may operate in a smaller bandwidth.

It is generally agreed upon that an additional coverage requirement of a 20 dB improvement in comparison to "category 1 UEs" is targeted for MTC devices. Large transmission time intervals (TTI) bundling size (e.g., in order of 100 subframes) may address DL and UL coverage enhancements. Furthermore, PDCCH, PBCH, and System Information Block (SIB) also may be bundled in an effort to achieve desired coverage for MTC. New transmissions of these channels may be denoted as MTC_PBCH, MTC_SIB, and so on. The modulation and coding scheme (MCS) and location of MTC_SIB may be signaled or predefined by a standard.

In Multimedia Broadcast Single Frequency Network (MBSFN) subframes in Release 10, two types of transmissions are allowed. For Multimedia Broadcast and Multicast Service (MBMS), all or a subset of MBSFN subframes may be determined by higher layers for PMCH decoding. For other MBSFN subframes, downlink transmission mode 9 and 10 based unicast may be supported.

The PMCH is a downlink physical layer channel that carries data (both control and traffic) originating from higher protocol layers for MBMS using MBSFN operation. Thus, the PMCH must be decoded for any control or traffic MBMS data. As noted above, an MBSFN area may include multiple PMCHs. Each PMCH may be mapped to a logical control channel. PSDCH and PMCH are not supported in the same subframe, as PMCH occupies the entire bandwidth.

The determination of an MBSFN subframe for MBMS at a UE may not be completely known at an eNB. Different UEs may subscribe to different MBMS services. As a result, the eNB and the UE may be misaligned regarding whether a MBSFN subframe is for PMCH or not.

Data region IC may be complex. For example, data region IC may involve several variations including, for example, unicast vs. broadcast, Radio Network Temporary Identifier (RNTI) dependency, transmission schemes (Space Frequency Block Code (SFBC), rank 1 to rank 8), reference signal (RS) dependency, cell ID, rate matching, modulation order, power levels, resource allocation type, and/or control vs. PDSCH (ePDCCH vs. PDSCH, distinct control regions sizes across cells).

Positioning RS (PRS) may be transmitted in PRS subframes configured for each cell. When both normal and MBSFN subframes are configured for PRS, the OFDM symbols in a MBSFN subframe configured for PRS should follow the same cyclic prefix as in subframe 0. When only MBSFN subframes are configured for PRS, OFDM symbols configured for PRS should use an extended CP.

PRS are transmitted on RS port 6. Periodicity T_PRS and cell specific subframe offset Delta_PRS are cell specific. They may be provided by PRS configuration index I_PRS. Sequence of PRS is a function of cell ID, CP length, slot, and OFDM symbol index. Resource mapping of PRS is a function of bandwidth, N_RB^PRS, configured by higher layers, and cell specific shift V_shift=PCI mod 6.

Network Assisted IC/IS for Multiple Services

Multiple services from neighbor cells may need to be considered for interference management, including IC and/or IS. The multiple services may include, for example, unicast transmissions, broadcast transmissions, multicast transmissions, MTC transmissions, PRS transmissions, and/or different waveforms. Aspects of the present disclosure are directed to interference management of different services from neighbor cells.

Figure 10:
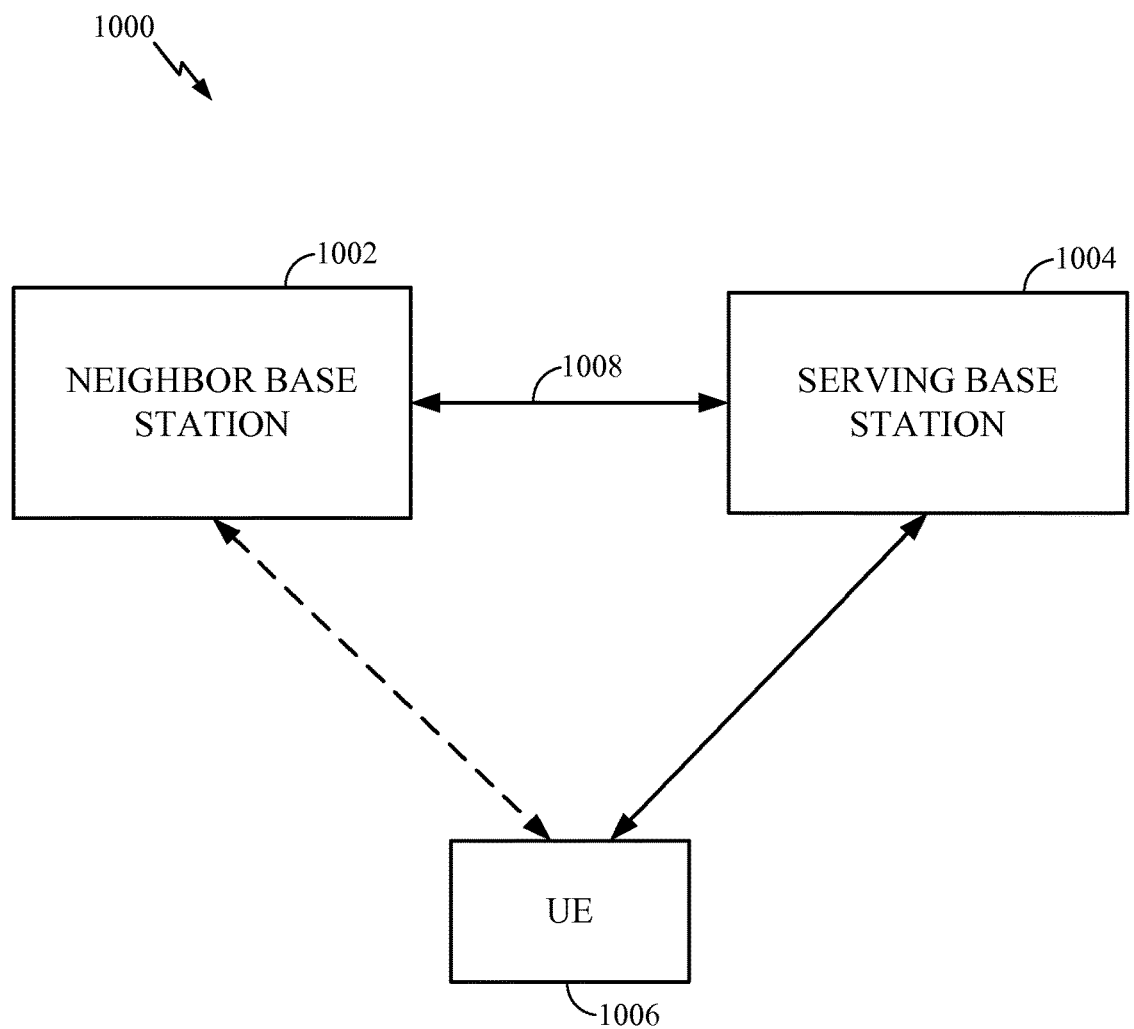
FIG. 10 illustrates example components of a wireless communication system, in accordance with certain aspects of the present disclosure.

FIG. 10 illustrates example components 1000 of a wireless communication system in accordance with aspects of the present disclosure. As will be described in more detail herein, a UE may determine information regarding system parameters for one or more types of communication services used to transmit potentially interfering signals in one or more neighbor cells. The UE may perform interference management using the determined information to cancel or suppress interference caused by the potentially interfering signals.

As illustrated in FIG. 10, UE 1006, which may be UE 102 of FIG. 1 and may include one or more modules of UE 650 in FIG. 6, may perform interference management to cancel and/or suppress interference caused by potentially interfering signals. In FIG. 10, the potentially interfering signals are indicated by a dashed line between one or more neighbor cells (e.g., neighbor base station 1002) and the UE 1006.

Transmission from one or more neighbor cells may include one or more types of communication services. These communication services may include at least two of Unicast transmissions, Broadcast transmissions, Multicast transmissions, MTC transmissions, and PRS transmissions. As will be explained in more detail herein, the UE may perform interference management differently for at least two of the communication services.

According an aspect, the UE may detect interfering signals from one or more neighbor cells and may process transmission from the serving cell, for example, serving base station 1004, based on the detected interfering signals.

The serving base station 1004 (eNB) may signal, to one or more UEs, MTC services related to one or more neighbor cells. For example, the eNB may signal if MTC operations are supported by the one or more neighbor cells, a bandwidth of MTC operations of the one or more neighbor cells, and/or the center frequency or frequency shift with respect to carrier center of the narrow band operation for the one or more neighbor cells. The eNB may signal subframes used for MTC transmissions by the one or more neighbor cells. This signaling may include a periodicity of MTC transmissions of the one or more neighbor cells. The MTC transmissions may include MTC services for communicating with low rate devices and/or MTC services for communicating with extended coverage.

The eNB may signal a level of bundling in DL MTC transmissions of the one or more neighbor cells to one or more UEs. For example, the level of bundling may include bundling size for MTC_PBCH, bundling size for MTC_SIB, bundling size for PDSCH, bundling size for PDCCH/ePDCCH, and/or bundling size for PHICH/Physical Format Indicator Channel (PFICH).

According to an aspect, the eNB may signal subframes for which IC and/or IS or some form of IC/IS should be disabled by the UE. This may include MTC subframes or any other subframes in which PDSCH, PDCCH, or ePDCCH IC may not be feasible.

According to an aspect, a UE may blindly detect MTC transmissions from one or more neighbor cells. For example, a specification may predefine certain parameters including, for example, MTC_PBCH, MTC_SIB, and so on. Thus, the MTC transmissions may be blindly detected against other signal transmissions. For example, according to aspects, if a bandwidth, modulation, coding rate, and/or radio network temporary identifier (RNTI) are predefined, a UE may use this information to perform blind decoding in an effort to detect MTC transmissions from one or more neighbor cells. The UE may process transmissions from a serving base station based on the detected interfering transmissions.

Regarding MBSFN specific handling, an eNB may signal a neighbor cell's MBSFN subframe configuration for IC and/or IS. Depending on the signaling, the UE may perform different interference management schemes. The UE may receive signaling of MBMS related configuration relative to demodulation reference signal (DMRS)-based unicast transmissions for MBSFN subframes. For example the UE may receive signaling indicating a neighboring cell's MBSFN ID set.

According to aspects, PRS may be used for IC and/or IS. For example, an eNB may signal one or more neighbor cells' PRS configuration. The PRS configuration may include a PRS configuration index (I_PRS) and/or PRS bandwidth (N_RB_PRS). The eNB may signal a PRS configuration jointly with MBSFN subframe configuration for CP determination. Alternatively, a UE may blindly decode a neighbor cell's PRS and may process transmissions from the serving base station based on the detected interfering transmissions.

Generally, according to aspects of the present disclosure, an eNB may signal information to be excluded from advanced receiver techniques (e.g., IC and/or IS) by the UE. The eNB may signal subbands in which the UE should not apply IC or blind decoding. The eNB may signal subframe subsets where the UE should not apply IC or blind decoding. Such signaling of subbands or subframes may be signaled in broadcast, multi-cast, RRC, and/or dynamically.

Network assisted IC and/or IS may involve information exchange 1008 between eNBs (e.g., between neighbor base station 1002 and serving base station 1004). For example, eNBs may exchange information related to MTC configurations and/or PRS configuration signaling. Additionally or alternatively, eNBs may signal MBSFN configurations and/or TDD subframe configuration. Signaling between eNBs may be based on an X2 interface. New fields may be defined for the X2 interface to accommodate such signaling. Alternatively, the information exchange may be based on a new interface.

According to aspects, a UE may signal IC-capabilities to one or more base stations. IC-capabilities may include waveforms (e.g., signals) detected by the UE, waveforms the UE may cancel, and/or hypotheses the UE may use in an effort to blindly detect potentially interfering waveforms. A network may schedule UEs based, at least in part, on the UE's IC-capability.

For example, the network may schedule the UE over waveforms with incompatible interference. According to this example, network signaling may not be necessary and the UE may classify waveforms. The network may signal new waveforms in an effort to save power at UE. Signaling new waveforms to the UE may help avoid mis-classification of a signal by a UE.

According to another example, the network may schedule the UE over waveforms with compatible interference. Again, network signaling may not be necessary and the UE may classify waveforms. The network may signal hypotheses to help the UE detect waveforms.

Figure 11:
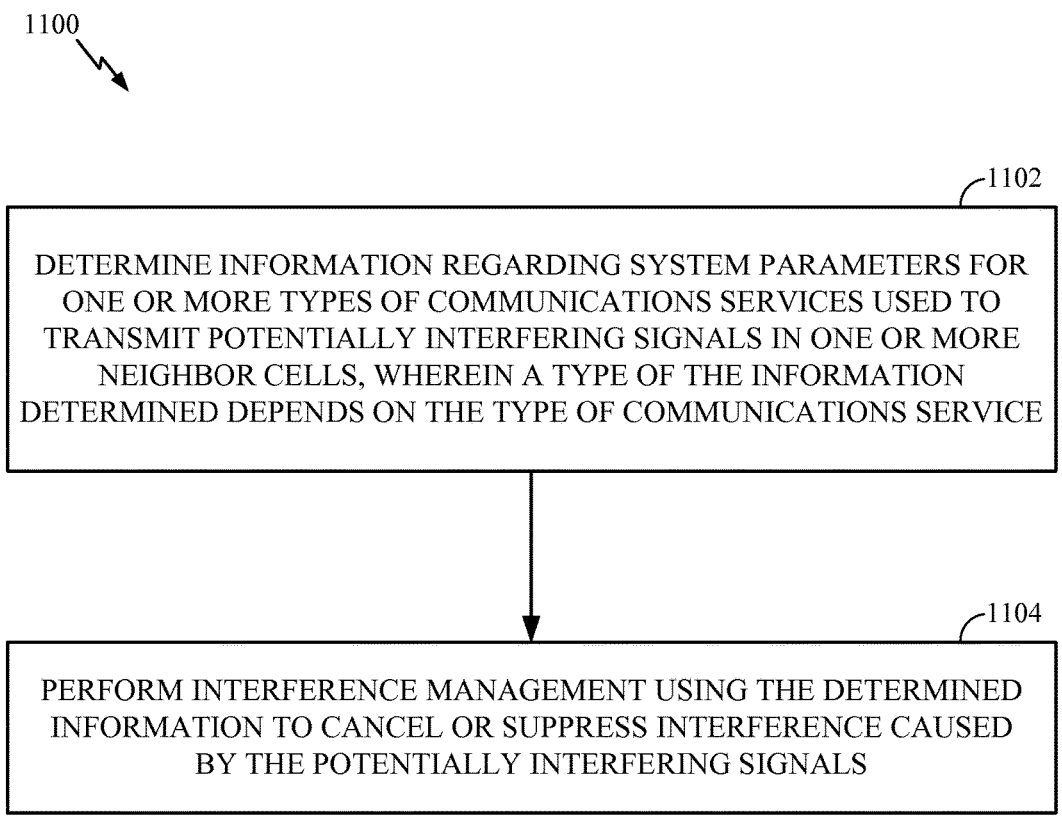
FIG. 11 illustrates example operations performed, for example, by a user equipment (UE) in an effort to perform interference management (e.g., interference cancellation (IC) and/or interference suppression (IS)), according to aspects of the disclosure.

FIG. 11 illustrates example operations 1100 performed, for example, by a UE, such as UE 1006 of FIG. 10. UE 1006 may be UE 102 of FIG. 1 which may include one or more modules of UE 650 of FIG. 6. For example, controller/processor 659 and/or Rx/Tx 654 may perform aspects described herein.

At 1102, the UE may determine information regarding system parameters for one or more types of communications services used to transmit potentially interfering signals in one or more neighbor cells, wherein a type of the information determined depends on the type of communications service. At 1104, the UE may perform interference management using the determined information to cancel or suppress interference caused by the potentially interfering signals.

As described above, interference management may include either IC and/or IS. According to aspects, the UE may perform interference management by detecting interfering signals from the one or more neighbor cells based on the determined information and the UE may process transmissions from a serving base station based on the detected interfering signals.

As described herein, the one or more types of communications services may include at least two of Unicast transmissions, Broadcast transmissions, Multicast transmissions, Machine Type Communications (MTC) transmissions, and positioning reference signal (PRS) transmissions. The UE may perform interference management differently for at least two of the communications services.

According to aspects, one of the one or more types of communications services may include machine type communications (MTC) services for communicating with low rate devices or MTC services for communicating with extended coverage devices.

Determining the information regarding system parameters may include at least one of: determining whether MTC operation is supported by one or more neighbor cells, determining a bandwidth of MTC operation, determining a location of frequency resources used for MTC operation, determining subframes used for MTC transmissions, determining periodicity of MTC transmissions, or determining a level of bundling for one or more types of MTC transmissions.

When one of the one or more types of communications services includes, for example, MTC, the UE may receive an indication of one or more subframes for which interference management should not be performed by the UE.

When one of the one or more types of communications services includes, for example, MTC, the UE may perform interference management by performing blind detection of interfering MTC transmissions and processing transmissions from the serving base station based on the detected interfering transmissions.

As noted above, one of the one or more types of communications services may include Multimedia Broadcast Single Frequency Network (MBSFN) services. When one or more types of communications services includes, for example, MBSFN services, the UE may determine information regarding system parameters by receiving signaling of MBSFN subframe configurations for one or more neighbor cells or receiving signaling of Multimedia Broadcast and Multicast Service (MBMS) related configuration relative to demodulation reference signal (DMRS)-based unicast transmissions for MBSFN subframes.

As noted above, one of the one or more types of communications services may include positioning services using positioning reference signals (PRS). When one or more types of communications services includes PRS, the UE may determine information regarding system parameters by receiving signaling of a PRS configuration for one or more neighbor cells. According to aspects, the UE may perform interference management by performing blind detection of PRS transmissions and processing transmissions from a serving base station based on the detected interfering transmissions.

According to aspects, determining the information regarding system parameters may include receiving signaling indicating at least one of subbands or subframe subsets where interference management should not be applied. The signaling may include at least one of broadcast signaling, multi-cast signaling, radio resource control (RRC) signaling, or dynamic signaling.

The UE may further signal its interference cancellation capabilities, which may include signaling at least one of at least one of detected signals, signals canceled by the UE, or one or more hypotheses used by the UE in an effort to detect a known signal.

Figure 12:
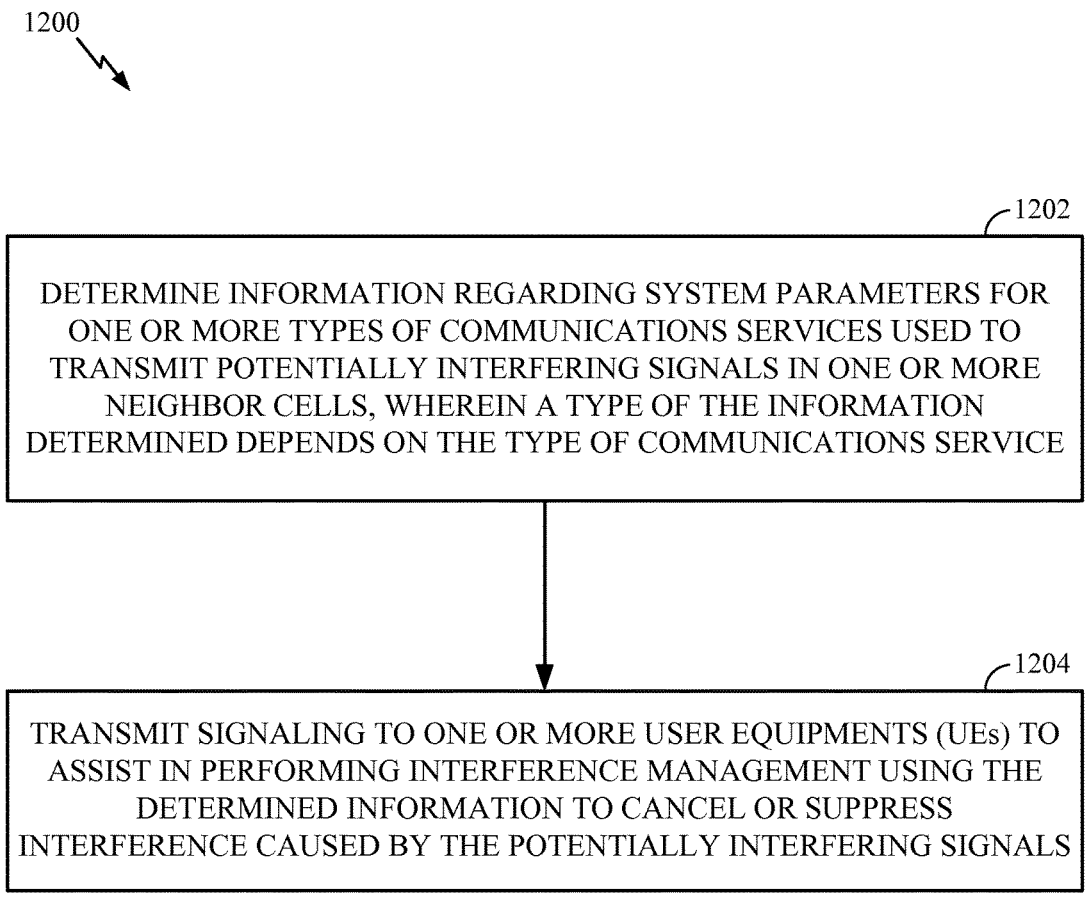
FIG. 12 illustrates example operations, performed, for example, by a serving base station, in an effort to assist in IC and/or IS for multiple services, according to aspects of the disclosure.

FIG. 12 illustrates example operations 1200 performed, for example, by base station, such a serving base station 1004. Base station 1004 may be an eNB 106 or 108, which may include one or more modules of eNB 610. For example, controller/processor 675 and/or Tx/Rx 618 may perform the aspects described herein.

At 1202, the base station may determine information regarding system parameters for one or more types of communications services used to transmit potentially interfering signals in one or more neighbor cells, wherein a type of the information determined depends on the type of communications service. At 1204, the base station may transmit signaling to one or more user equipments (UEs) to assist in performing interference management using the determined information to cancel or suppress interference caused by the potentially interfering signals.

As described herein, when one of the one or more types of communications services include machine type communications (MTC) services for communicating with low rate devices or MTC services for communicating with extended coverage devices, the BS may transmit signaling indicating at least one of: whether MTC operation is supported by one or more neighbor cells, a bandwidth of MTC operation, a location of frequency resources used for MTC operation, subframes used for MTC transmissions, periodicity of MTC transmissions, or a level of bundling for one or more types of MTC transmissions. The BS may also transmit an indication of one or more subframes for which interference management should not be performed.

According to aspects, when one of the one or more types of communications services include MBSFN services, the BS may transmit signaling of MBSFN subframe configurations for one or more neighbor cells, or transmit signaling of Multimedia Broadcast and Multicast Service (MBMS) related configuration relative to DMRS-based unicast transmissions for MBSFN subframes.

According to aspects, when one of the one or more types of communications services include positioning services using positioning reference signals (PRS), the BS may transmit signaling indicating at least one of subbands or subframe subsets where interference management should not be applied. The signaling may include at least one of broadcast signaling, multi-cast signaling, RRC signaling, or dynamic signaling.

According to aspects, BS may exchange signaling with the one or more neighbor cells. The signaling may include information indicative of at least one of a MTC configuration, PRS configuration, MBSFN configuration, or time division duplex (TDD) subframe configuration. The signaling may be based on an X2 interface.

According to aspects, the BS may determine information regarding system parameters for one or more types of communications services used to transmit potentially interfering signals in one or more neighbor cells by receiving interference cancellation capabilities from a UE, wherein the received interference cancellation capabilities may include at least one of: signals detected by the UE, signals canceled by the UE, or one or more hypotheses used by the UE in an effort to detect a known signal. According to aspects, the BS may schedule the UE based on the received interference cancellation capabilities.

Thus, aspects of the present disclosure address issues of interference management, including interference suppression and interference cancellation, to cancel or suppress interference caused by potentially interfering signals from multiple services.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more."

Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as means plus function unless the element is expressly recited using the phrase "means for."

What is claimed is:

1. A method for wireless communication by a user equipment (UE), comprising:
   determining information regarding system parameters for one or more types of communications services used to transmit potentially interfering signals in one or more neighbor cells, wherein a type of the information determined depends on the type of the communications service;
   detecting interfering signals from the one or more neighbor cells based on the determined information; and
   performing interference management using the determined information to cancel or suppress interference caused by the detected interfering signals to the UE, wherein the interference management is performed differently for at least two of the communications services.

2. The method of claim 1, wherein performing interference management using the determined information comprises:
   processing transmissions from a serving base station based on the detected interfering signals.

3. The method of claim 1, wherein:
   the one or more types of communications services comprise at least two of Unicast transmissions, Broadcast transmissions, Multicast transmissions, Machine Type Communications (MTC) transmissions, or positioning reference signal (PRS) transmissions.

4. The method of claim 1, wherein the one or more types of communications services comprise at least one of machine type communications (MTC) services for communicating with low rate devices and MTC services for communicating with extended coverage devices.

5. The method of claim 4, wherein the determining comprises receiving signaling indicating at least one of:
   whether MTC operation is supported by one or more neighbor cells;
   a bandwidth of MTC operation;
   a location of frequency resources used for MTC operation;
   subframes used for MTC transmissions;
   periodicity of MTC transmissions; or
   a level of bundling for one or more types of MTC transmissions.

6. The method of claim 4, further comprising receiving an indication of one or more subframes for which interference management should not be performed.

7. The method of claim 4, wherein performing interference management comprises:
   performing blind detection of interfering MTC transmissions; and
   processing transmissions from the serving base station based on the detected interfering transmissions.

8. The method of claim 1, wherein the one or more types of communications services comprise Multimedia Broadcast Single Frequency Network (MBSFN) services.

9. The method of claim 8, wherein the determining comprises at least one of:
   receiving signaling of MBSFN subframe configurations for one or more neighbor cells; or
   receiving signaling of Multimedia Broadcast and Multicast Service (MBMS) related configuration relative to demodulation reference signal (DMRS)-based unicast transmissions for MBSFN subframes.

10. The method of claim 1, wherein the one or more types of communications services comprise positioning services using positioning reference signals (PRS).

11. The method of claim 10, wherein the determining comprises:
    receiving signaling of a PRS configuration for one or more neighbor cells.

12. The method of claim 10, wherein performing interference management comprises:
    performing blind detection of PRS transmissions; and
    processing transmissions from a serving base station based on the detected interfering transmissions.

13. The method of claim 1, wherein the determining comprises:
    receiving signaling indicating at least one of subbands or subframe subsets where interference management should not be applied.

14. The method of claim 13, wherein the signaling comprises at least one of broadcast signaling, multi-cast signaling, radio resource control (RRC) signaling, or dynamic signaling.

15. The method of claim 1, further comprising:
    signaling interference cancellation capabilities of the UE including at least one of detected signals, signals canceled by the UE, or one or more hypotheses used by the UE in an effort to detect a known signal.

16. A method for wireless communication by a base station (BS), comprising:
    determining information regarding system parameters for one or more types of communications services used to transmit potentially interfering signals in one or more neighbor cells, wherein a type of the information determined depends on the type of the communications service; and
    transmitting signaling to one or more user equipments (UEs) to assist the one or more UEs in performing interference management using the determined information to cancel or suppress interference caused by the potentially interfering signals to the one or more UEs, wherein the interference management is performed differently for at least two of the communications services.

17. The method of claim 16, wherein:
    the one or more types of communications services comprise at least two of Unicast transmissions, Broadcast transmissions, Multicast transmissions, Machine Type Communications (MTC) transmissions, or positioning reference signal (PRS) transmissions.

18. The method of claim 16, wherein the one or more types of communications services comprise at least one of machine type communications (MTC) services for communicating with low rate devices and MTC services for communicating with extended coverage devices.

19. The method of claim 18, wherein the transmitting comprises transmitting signaling indicating at least one of:
    whether MTC operation is supported by one or more neighbor cells;
    a bandwidth of MTC operation;

a location of frequency resources used for MTC operation;

subframes used for MTC transmissions;

periodicity of MTC transmissions; or a level of bundling for one or more types of MTC transmissions.

20. The method of claim 18, further comprising transmitting an indication of one or more subframes for which interference management should not be performed.

21. The method of claim 16, wherein the one or more types of communications services comprise Multimedia Broadcast Single Frequency Network (MBSFN) services.

22. The method of claim 21, wherein the transmitting comprises at least one of:

transmitting signaling of MBSFN subframe configurations for one or more neighbor cells; or transmitting signaling of Multimedia Broadcast and Multicast Service (MBMS) related configuration relative to demodulation reference signal (DMRS)-based unicast transmissions for MBSFN subframes.

23. The method of claim 16, wherein the one or more types of communications services comprise positioning services using positioning reference signals (PRS).

24. The method of claim 16, wherein the transmitting comprises:

transmitting signaling indicating at least one of subbands or subframe subsets where interference management should not be applied.

25. The method of claim 24, wherein the signaling comprises at least one of broadcast signaling, multi-cast signaling, radio resource control (RRC) signaling, or dynamic signaling.

26. The method of claim 16, further comprising:

exchanging signaling with the one or more neighbor cells including at least one of a MTC configuration, positioning reference signal (PRS) configuration, Multimedia Broadcast Single Frequency Network (MBSFN) configuration, or time divisional duplex (TDD) subframe configuration.

27. The method of claim 16, wherein determining information regarding system parameters for one or more types of communications services used to transmit potentially interfering signals in one or more neighbor cells comprises:

receiving interference cancellation capabilities from a UE of the one or more UEs, wherein the interference cancellation capabilities includes at least one of signals detected by the UE, signals canceled by the UE, or one or more hypotheses used by the UE in an effort to detect a known signal.

28. The method of claim 27, further comprising:

scheduling the UE based on the received interference cancellation capabilities.

29. An apparatus for wireless communication by a user equipment (UE), comprising:

means for determining information regarding system parameters for one or more types of communications services used to transmit potentially interfering signals in one or more neighbor cells, wherein a type of the information determined depends on the type of the communications service;

means for detecting interfering signals from the one or more neighbor cells based on the determined information; and means for performing interference management using the determined information to cancel or suppress interference caused by the detected interfering signals to the UE, wherein the interference management is performed differently for at least two of the communications services.

30. An apparatus for wireless communication, comprising:

means for determining information regarding system parameters for one or more types of communications services used to transmit potentially interfering signals in one or more neighbor cells, wherein a type of the information determined depends on the type of the communications service; and means for transmitting signaling to one or more user equipments (UEs) to assist the one or more UEs in performing interference management using the determined information to cancel or suppress interference caused by the potentially interfering signals to the one or more UEs wherein the interference management is performed differently for at least two of the communications services.

* * * * *